(12) United States Patent
Gerdes et al.

(10) Patent No.: US 12,100,943 B2
(45) Date of Patent: Sep. 24, 2024

(54) CURRENT PROTECTION TO PREVENT OVERCURRENT IN ELECTRICAL GRIDS AND MOTORS

(71) Applicant: Caterpillar Inc., Peoria, IL (US)

(72) Inventors: Jesse R. Gerdes, Dunlap, IL (US); Jackson Wai, Dunlap, IL (US); Seok-hee Han, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 190 days.

(21) Appl. No.: 17/830,179

(22) Filed: Jun. 1, 2022

(65) Prior Publication Data
US 2023/0396054 A1    Dec. 7, 2023

(51) Int. Cl.
| | |
|---|---|
| *H02H 3/08* | (2006.01) |
| *H02M 1/00* | (2007.01) |
| *H02M 1/32* | (2007.01) |
| *H02M 7/5387* | (2007.01) |
| *H02P 29/024* | (2016.01) |

(52) U.S. Cl.
CPC .......... *H02H 3/083* (2013.01); *H02M 1/0009* (2021.05); *H02M 1/32* (2013.01); *H02M 7/53871* (2013.01); *H02P 29/027* (2013.01)

(58) Field of Classification Search
CPC ...... H02H 3/083; H02M 1/0009; H02M 1/32; H02M 7/53871; H02P 29/027
USPC ...................................................... 361/93.1
See application file for complete search history.

(56) References Cited

U.S. PATENT DOCUMENTS

| | | | |
|---|---|---|---|
| 6,710,992 B2 | 3/2004 | Pannwitz et al. | |
| 8,269,451 B2 * | 9/2012 | Kitanaka | B60L 3/0023 |
| | | | 318/434 |
| 8,575,879 B2 * | 11/2013 | Welchko | H02M 1/32 |
| | | | 361/84 |
| 9,160,160 B2 | 10/2015 | Chen | |

(Continued)

FOREIGN PATENT DOCUMENTS

| | | | | |
|---|---|---|---|---|
| CN | 116330976 A | * | 6/2023 | .............. B60L 15/20 |
| WO | WO-2010080431 A2 | * | 7/2010 | ................ H02J 3/38 |

(Continued)

OTHER PUBLICATIONS

Cho Yongsoo; Title: A overcurrent protection apparatus of inverter; Filed date: Aug. 5, 2019; Specification and drawings (Year: 2019).*

(Continued)

*Primary Examiner* — Dharti H Patel

(57) ABSTRACT

An apparatus can include an inverter to provide an output N-phase alternating-current to an external component. When N equals two, a phase of the N phases can include an upper gate and a lower gate. The apparatus can also include a current detector configured to detect a phase current magnitude of the output alternating current. The apparatus can also include a controller coupled to the current detector and to the inverter. The controller can generate a gate command for controlling a gate of the inverter. The controller can also determine a value for a current threshold less than a shutoff current threshold for the external component. The controller can provide a protection command to turn off the upper gate of a corresponding phase of the inverter responsive to detecting that the phase current magnitude is greater than the current threshold.

21 Claims, 5 Drawing Sheets

(56) References Cited

U.S. PATENT DOCUMENTS

| | | | |
|---|---|---|---|
| 9,595,886 B2 | 3/2017 | Achihara et al. | |
| 11,056,874 B2 | 7/2021 | Schweitzer, III et al. | |
| 2010/0076638 A1* | 3/2010 | Kitanaka | B60L 3/0061 |
| | | | 361/30 |
| 2012/0194856 A1 | 8/2012 | Koizumi | |
| 2013/0342950 A1* | 12/2013 | Westrick, Jr. | H01H 47/22 |
| | | | 361/170 |
| 2016/0211772 A1* | 7/2016 | Degner | H02M 1/38 |
| 2017/0353138 A1* | 12/2017 | Zhang | H02P 27/06 |
| 2022/0115974 A1* | 4/2022 | Kobayashi | F25B 31/026 |
| 2023/0134487 A1* | 5/2023 | Tanabe | H02P 29/662 |
| | | | 318/400.08 |
| 2023/0268822 A1* | 8/2023 | Doi | B60L 3/003 |
| | | | 363/56.01 |

FOREIGN PATENT DOCUMENTS

| | | |
|---|---|---|
| WO | 2022064733 | 3/2022 |
| WO | WO-2023095695 A1 * | 6/2023 |

OTHER PUBLICATIONS

Yu Dachuan; Title: Power inverter control for Grid-tie transition; Filed date: Dec. 16, 2009; Specification and drawings (Year: 2010).*

* cited by examiner

CURRENT PROTECTION TO PREVENT OVERCURRENT IN ELECTRICAL GRIDS AND MOTORS

TECHNICAL FIELD

This disclosure relates to an overcurrent detection system and more specifically to a system and method for avoidance of overcurrent situations that result in a shutoff condition of equipment.

BACKGROUND

A microgrid is a localized grouping of electrical generation, electrical energy storage, and electrical loads. A controller can be used to control current provided to the microgrid to prevent damage to the inverter components through overcurrent conditions. Some conditions, for example certain mode transitions, overloads, and system failures, can cause current to rise faster than the controller can control to a desired level, and the controller can therefore shut down current output to the microgrid to prevent damage to inverter components. Similar systems can also be used for controlling how current is provided to motors and generators. However, shutting down the microgrids, motors, etc. can be costly for operators. Therefore, there is a general need to prevent overcurrent situations before they rise to the level of requiring a complete system shutdown.

US patent application 2022/0115974 discusses a driving apparatus that provides current to a motor, detects the motor current, and shuts down the motor upon detecting that the current exceeds an overcurrent protection threshold.

SUMMARY OF THE INVENTION

In an example according to the present disclosure, an apparatus can comprise an inverter configured to provide an output N-phase alternating current to an external component, a phase of the N phases including an upper gate and a lower gate. The apparatus can further comprise a current detector configured to detect a magnitude of a phase current of the output N-phase alternating current for each phase. The apparatus can further comprise a controller coupled to the current detector and to the inverter and configured to generate a gate command for controlling a gate of the inverter. The controller can be configured to determine a value for a current threshold less than a shutoff current threshold for the external component. The controller can further be configured to provide a protection command to turn off the upper gate of a corresponding phase of the inverter responsive to detecting that the magnitude of the phase current is greater than the current threshold.

In a further example, a system for power delivery can comprise a power device including at least one of an electrical grid, a microgrid, or a motor; and an apparatus coupled to the power device and configured to control current provided to the power device.

In a further example, a method for controlling current in a power delivery system can comprise detecting a phase current magnitude of an output alternating current of an inverter. The method can further comprise providing a protection command to turn off an upper gate of a corresponding phase of the inverter responsive to detecting that the phase current magnitude is greater than a threshold.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
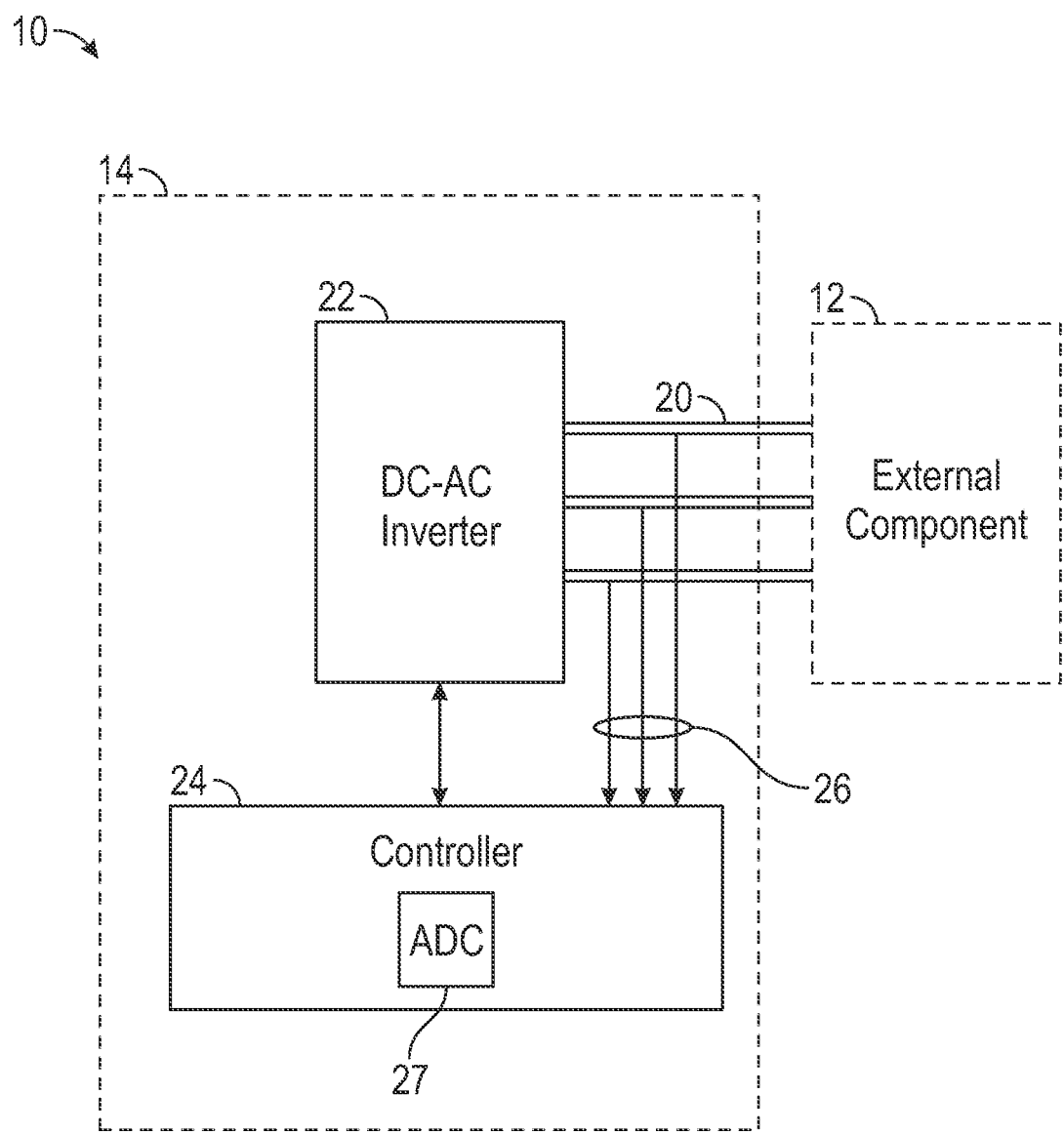
FIG. 1 shows a block diagram of a system for preventing overcurrent conditions in accordance with this disclosure.
Figure 3:
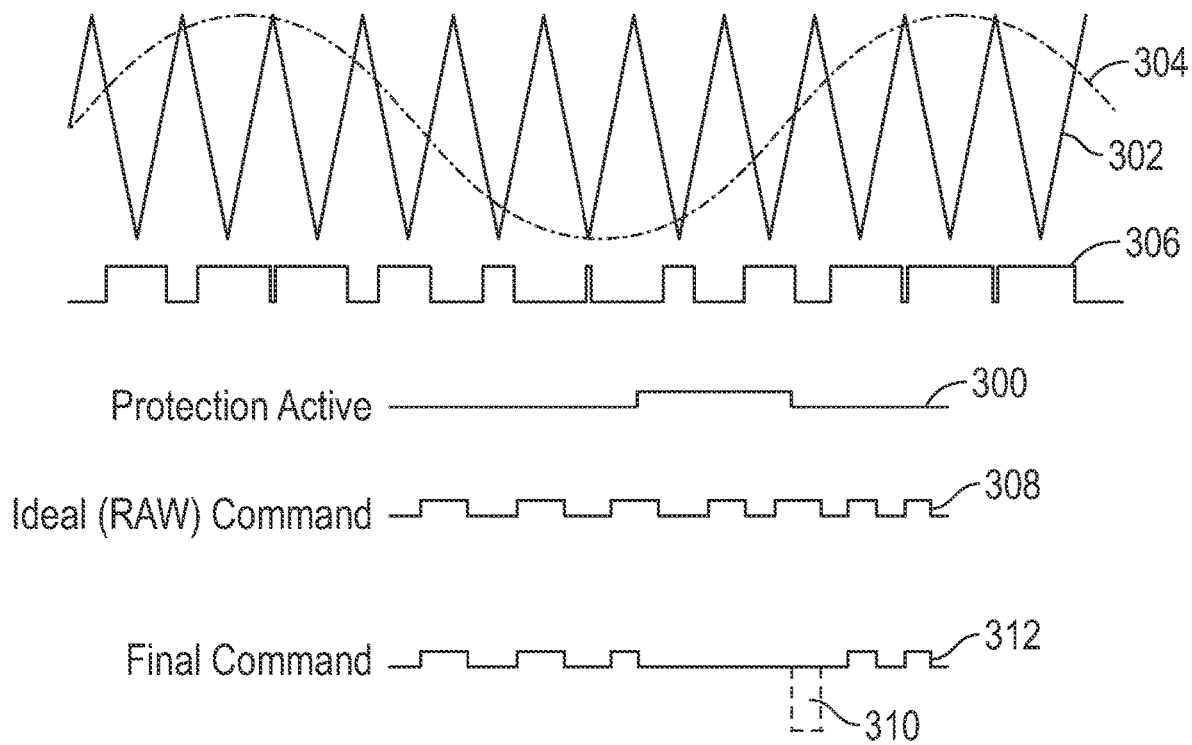
FIG. 3 shows a protection signal in relation to other signals within a system in accordance with this disclosure.

FIG. 1 shows a block diagram of a system 10 for preventing overcurrent conditions in accordance with this disclosure. As shown in FIG. 1, the system manages power transfer to an external component 12. In some embodiments, the external component 12 includes a grid (e.g., an electrical grid or a microgrid). In some embodiments, the external component 12 can include a motor or a generator. In some embodiment, the external component 12 can comprise a motor of a vehicle, for example a work machine 100 (FIG. 3). The system 10 includes an apparatus 14. The apparatus 14 can include an inverter 22 configured to provide an output N-phase alternating-current 20 to the external component 12. The N-phases and inverter circuitry are described in more detail with reference to FIG. 4.

In embodiments in which the external component 12 comprises a grid, the external component 12 can include both loads and power sources (not depicted). The power sources may include solar panels, wind turbines, diesel or gas generator sets, fuel cells, and/or the utility grid.

The apparatus 14 can be coupled to the grid 12 via an N-phase bus 20. In examples, the bus 20 is a three-phase bus, although embodiments are not limited thereto. The apparatus 14 can include a DC-to-AC bi-directional inverter 22 and a load controller 24 with a sensor connection 26 for the external component 12. In examples, the external component 12 comprises a three-phase grid or a three-phase motor, although embodiments are not limited to three phases. The sensor connection 26 can include one or more current detector/s configured to detect a phase current magnitude of the output alternating current.

The apparatus 14 outputs current to the external component 12. Generally, current rises faster during certain mode transitions, overload conditions, or failure conditions. The controller 24 is coupled to the current detector (e.g., sensor 26) and to the inverter and configured to generate a gate command for controlling a gate of the inverter (e.g., the inverter 22). The controller 24 may not control the output current to a desired level within a preferred or desired amount of time under all load conditions, fault conditions, mode transitions, etc. This condition can result in a shutdown to protect components of the external component 12. Shutdown can be costly, and it can be time-consuming to bring the external component 12 back online after a shutdown.

The apparatus 14 according to some embodiments addresses these and other concerns by limiting current output to the external component 12 when current crosses a threshold beyond a normally commanded value but within the threshold used to shut the system down because of an overcurrent. These thresholds are illustrated in FIG. 2.

Figure 2:
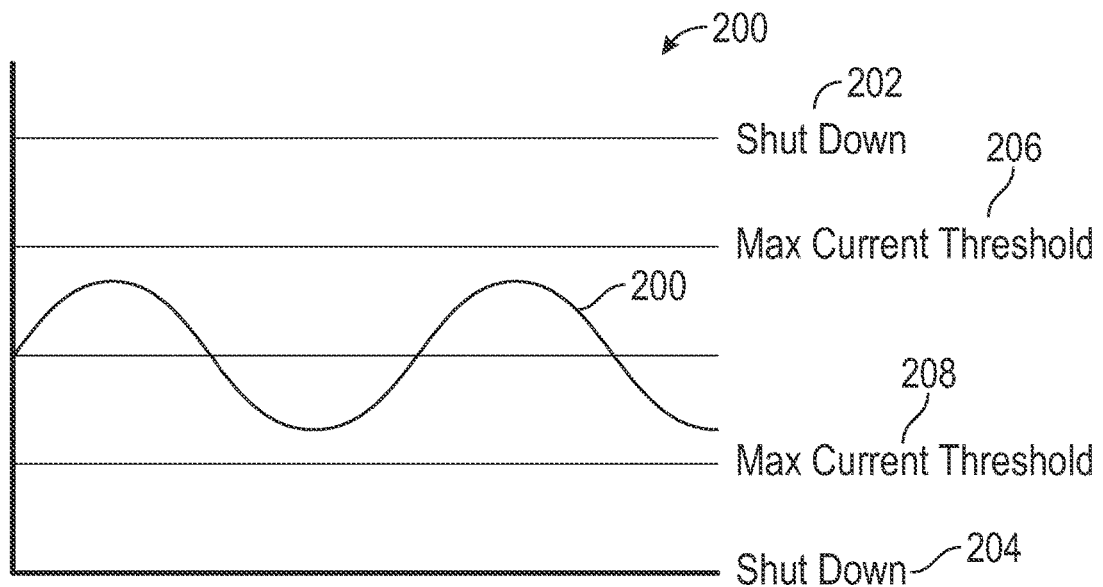
FIG. 2 shows shutdown thresholds and maximum current thresholds in accordance with this disclosure.

FIG. 2 shows shutdown thresholds and maximum current thresholds in accordance with this disclosure. Output current 200 is illustrated as sine wave. While a sine wave is shown, embodiments are not limited thereto, and the representation of output current can take other shapes. If the output current exceeds a positive shutdown current threshold 202 or, conversely, if negative values of the current fall below negative shutdown current threshold 204, then the apparatus 14 according to embodiments can control the inverter 22 to stop providing current (e.g., shutdown) to the external component 12. For example, as described later herein, a gate in the apparatus 14 that can be controlled to force a lower voltage that will drive down the current 200. The positive current threshold 206 can be set at a value within a certain range of the positive shutdown current threshold 202. A similar negative current threshold 208 can be set at a value within a certain range of the negative shutdown current threshold 204. This range can be based on bandwidth of the system, response time of the system, speed with which current can be expected to rise in error conditions, or other conditions.

FIG. 3 shows a protection signal 300 in relation to other signals within a system in accordance with this disclosure. The protection signal 300 acts to interrupt control of gates of the inverter 22 based on detected currents as described herein. The protection signal 300 can be provided by the controller 24 (FIG. 1) as part of a firmware solution, a software solution (e.g., as a field-programmable gate array (FPGA) solution, or a hardware solution. As such, the controller 24 can include processing circuitry, memory, etc. The protection signal is turned on (e.g., "enabled" or "activated") responsive to a comparison between phase current and the maximum current threshold. Since there are multiple phases, there are multiple protection signals, one per phase. The protection signal is disabled (lower priority than the enable) when the protected gate command matches the raw gate command, and the current is below the maximum current threshold.

As seen in FIG. 3, a sine-triangle switching method can be used, in which a relatively fast (high frequency) carrier wave 302 and a slower reference wave 304 (which may be a sine wave), is used to generate a pulse-width modulation (PWM) signal 306 that represents a comparison of carrier wave 302 and reference wave 304. PWM signal 306 can be considered an ideal raw command, in a manner similar to signal 308, although PWM signal 306 is provided and drawn separately for illustrative purposes. similar to signal 308, although signal 308 is provided separately. In aspects, the carrier wave 302 can be much faster (e.g., at least 10 times to 20 times faster) than the reference wave 304, although a slower carrier wave 302 is shown in FIG. 3 for clarity. The carrier wave 302 can run at a nominal frequency and the reference wave 304 can be synchronous with the system frequency or apparatus 14 frequency. While a sine-triangle wave implementation and switching strategy is described, embodiments are not limited thereto and can include space-vector PWM or other implementations and switching strategies. The PWM signal 306 can be high (and conversely low when the reference wave 304 is lower than the carrier wave 302). Embodiments are and systems according to embodiments are independent of how the PWM signal 306 is generated.

The solution can deactivate (e.g., the protection signal 300 is turned off or goes low) when the current is below the maximum threshold and the raw switch command 308 (the switch command before being intercepted by the solution in accordance with some embodiments) matches the switch command (e.g., protection signal 300) applied by the solution. Curve 312 represents the final command applied to the upper gate of a two-level inverter and represents a combination of protection signal 300 and raw switch command 308, such that when protection signal 300 is high, the curve 312 is low. Otherwise, when protection signal 300 is low, curve 312 should match curve 308. In cases in which the final command is applied to the lower gate, the curve 312 will be opposite curve 312 shown in FIG. 3. Time period 310 represents a time at which "turning on" of the upper gate is not allowed for a short period of time to assure that a pulse is not inserted while protection is active. In general, the lower gate state is always the opposite of the upper gate state. The difference between the positive maximum current threshold being active and the negative being active, with respect to FIG. 3 and signal 312, is that when the positive maximum current protection is active the final command is held low (which results in the upper gate being off and the lower gate being on for a two-level inverter) and when the negative maximum current command is active the final command is held high (which results in the upper gate being on and the lower gate being off).

For two level solutions, there are two possible output voltages: +Vdc and −Vdc. The protection can apply −Vdc for the positive current case to drive down the current and it can apply +Vdc for the negative current case to drive the current towards zero. For three level solutions, there are three possible output voltages: +Vdc, 0V, and −Vdc. The protection for three level solutions stops/prevents the system from applying +Vdc when the positive protection is active which will result in the system transitioning to apply 0V and allow the system to apply −Vdc if the raw commands attempt to apply −Vdc. For the negative protection, the protection stops/prevents the system from applying −Vdc when the negative protection is active which will result in the system transitioning to apply 0 V and allow it to apply +Vdc if the raw commands attempts to apply +Vdc. In cases of three—(or greater) level inverters, the topology allows more flexibility when maximum current protection is active in choosing the desired voltage level to apply to protect the system. For example, if the positive maximum current is active, the controller 24 could choose a state (defined by the combination of gates enabled for a particular phase) that lowers the voltage to zero, a less positive voltage, or the maximum negative voltage allowing tradeoffs between maximum current threshold, speed of driving current within the desired range, and other side effects caused by applying this protection. Changing the voltage by a larger magnitude requires additional steps in voltage to apply voltage in a proper order and will result in masking off additional possible voltage states while the protection is active.

In still other aspects, the controller 22 can force the system to apply −Vdc and not allow +Vdc or 0 if the positive protection is active (and the opposite for the negative) although this may have more undesirable effects. A "dead time" can be implemented such that both the upper and lower switches are off for a transition period (e.g., before one or the other of the switches is turned "off" and the other switch is turned "on"). Additionally, protection according to embodiments can override other types of protection but can be overridden by a complete system shutdown. This can prevent direct shorts between a battery (e.g., DC voltage) and ground. In embodiments, shutdown protection has higher priority to prevent damage to system components.

The matching command state prevents any additional change of state of the switches from occurring, which could violate device switching frequency limits that are in place to thermally protect the switches. Further, instead of providing a single limit or threshold at which protection is enabled and disabled, a hysteresis band could be implemented as described in further detail later herein.

In some embodiments, therefore, pulse by pulse current limiting forces the gate commands for a single phase to a state that will force the current in a phase to reduce in magnitude when the phase current magnitude crosses a threshold. In some examples, the threshold used can be stored in memory, e.g., in a register, accessed by the controller 24. More than one threshold can be stored; for example, one threshold can be used for positive currents and another for negative currents. If a phase current is a large positive current, the upper gate of a phase will shut off, causing the lower gate to turn on, which can force the magnitude of the current to reduce. The opposite is true for large negative currents.

The apparatus 14 can further comprise an analog-to-digital converter (ADC) 27 within the controller 24. The phase current measured by the ADC 27 may not be filtered by the controller 24 in order to speed response times of embodiments. However, in other examples, a separate filter coefficient can be provided in case some filtering is desired. The controller 24 is further configured to maintain the upper gate in an off state until the phase current magnitude is below the current threshold. If a phase triggers, that phase must remain in its current state until the magnitude of the current is below the threshold and the raw command matches the current state of the command (the state being forced by the protection) to prevent additional switches from occurring. Each occurrence of this feature triggering is counted per phase and provided in the registers or other memory of the apparatus 14. These registers can comprise a type of read register. This is to allow a higher level controller running at a slower loop rate to know that this is occurring and at what rate to allow it to potentially make additional decisions.

Figure 4:
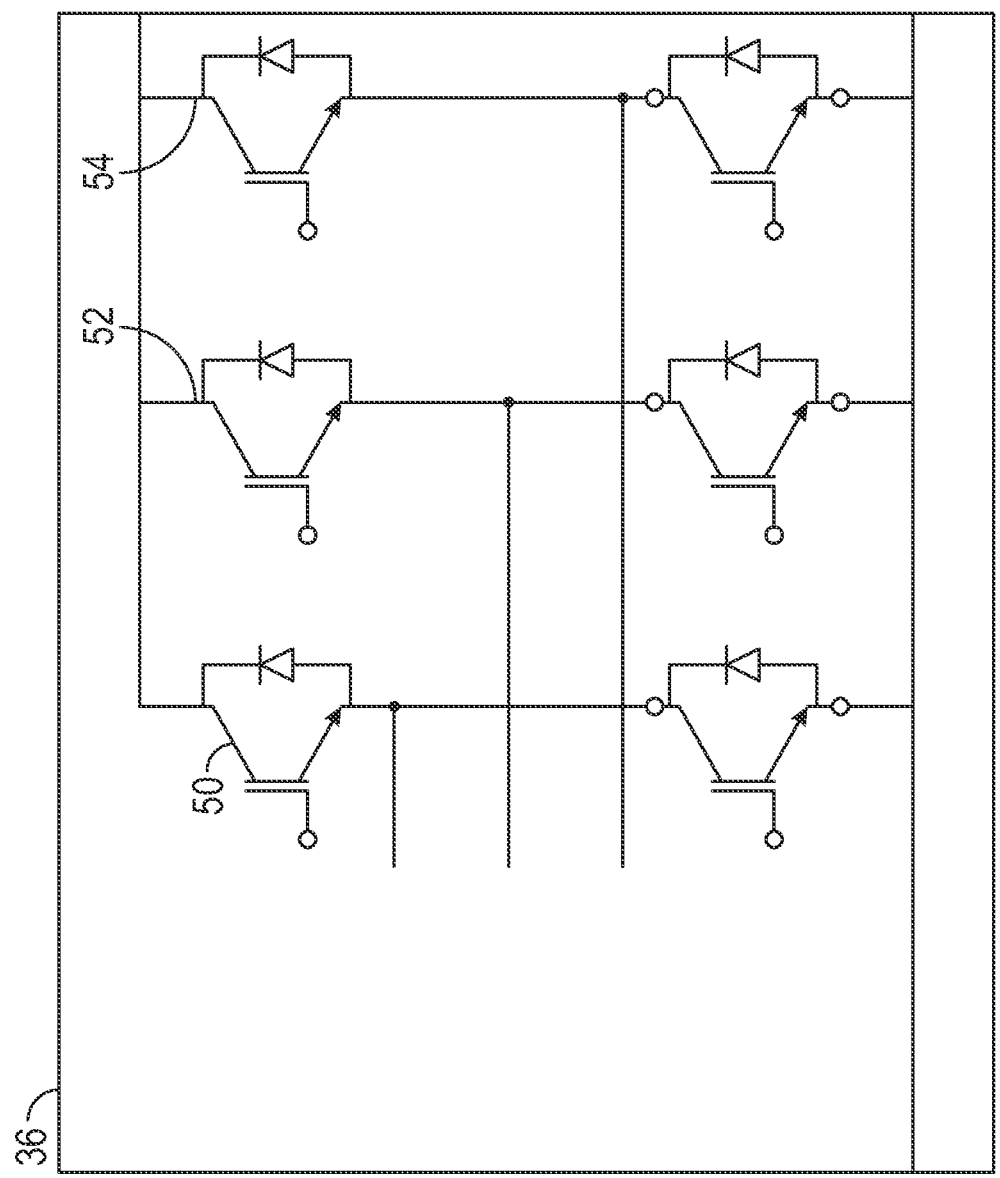
FIG. 4 shows a schematic diagram of an inverter for preventing overcurrent conditions in accordance with this disclosure.

FIG. 4 shows a schematic diagram of the inverter 36 for preventing overcurrent conditions in accordance with this disclosure. The inverter 36 uses pairs of switching transistors 50, 52, 54 with the switching transistors 50, 52, 54 together driving several potential loads (e.g., grid, motor, generator) through various topologies that can include an LC circuit and transformer (not shown in FIG. 4) in a conventional manner. Each of the switching transistors 50 may be an insulated gate bipolar transistor (IGBT), often used in high voltage and high current power applications. The transformers 56 can comprise Delta-Wye transformers although embodiments are not limited thereto.

Figure 5:
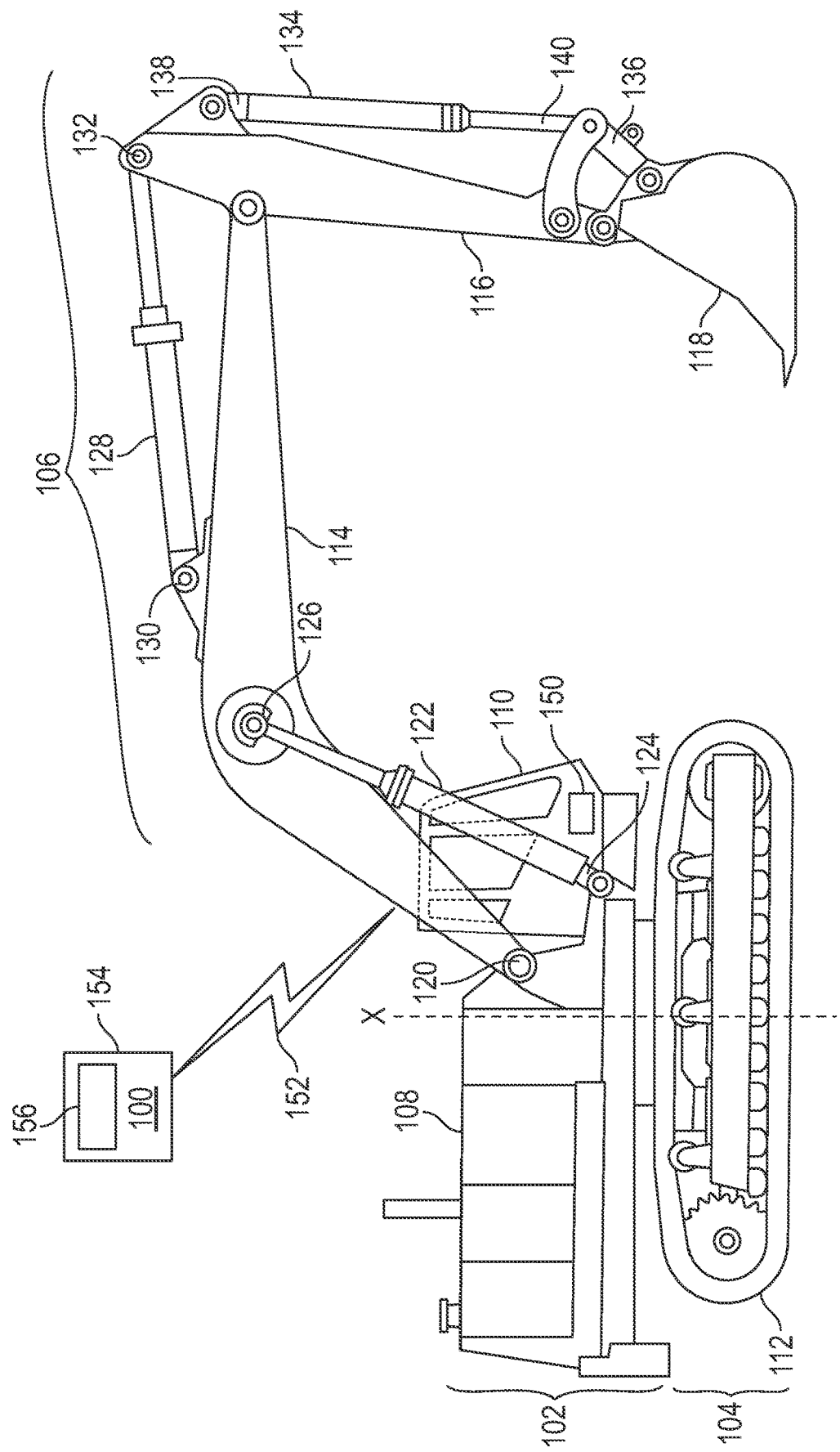
FIG. 5 shows a side view of a work machine, in accordance with this disclosure.

As mentioned earlier herein, the external component 12 can comprise a motor or generator. In some examples, the motor can be a high-powered motor of, for example, a work machine 100. FIG. 5 illustrates an example work machine 100 in which an overcurrent apparatus 14 can be implemented. While FIG. 5 illustrates an excavator as the work machine, any other type of vehicle could also include the overcurrent apparatus 14, and embodiments are not limited to use on an excavator.

Referring to FIG. 5, a work machine 100 may include an upper structure 102, a lower structure 104 and a working element 106. The upper structure 102 may include a body 108 and an operator cab 110. The operator cab 110 is mounted on the body 108. The operator cab 110 may include devices that receive input from a machine operator which may indicate a desired maneuvering of the work machine 100. Specifically, the operator cab 110 may include one or more operator interface devices. Examples of operator interface devices include, but are not limited to, a joystick, a travel control lever, and/or a pedal (none of which are shown but are well known in the industry).

The lower structure 104 may comprise a pair of tracks 112 (e.g., transportation device), to drive the work machine 100 on a path. The pair of tracks 112 may be driven by a hydrostatic transmission or by electric travel motors which, in turn, are powered by a prime mover such as an internal combustion engine (not shown). The overcurrent protection apparatus 14 can help prevent overcurrent conditions resulting from operations of the work machine 100 by limiting current to a generator or motor of the work machine 100 (not shown in FIG. 5). For example, each output of the apparatus 14 can be connected to a lead of a motor of the work machine 100.

The working element 106 includes a boom 114, an arm (e.g., "stick") 116, and a work tool 118. The work tool 118 can comprise, for example, a bucket. The boom 114 may be mounted on the body 108 at a pivot point 120. The boom 114 is made to vertically pivot by means of a boom hydraulic cylinder 122. A first end 124 of the boom hydraulic cylinder 122 may be coupled to the body 108. A second end 126 of the boom hydraulic cylinder 122 may be coupled to the boom 114. The boom 114 may be coupled to the stick 116.

The stick 116 is moved with respect to the boom 114 by extending or retracting an arm hydraulic cylinder 128. A first end 130 of the arm hydraulic cylinder 128 is coupled to the boom 114. A second end 132 of the arm hydraulic cylinder 128 is coupled to the stick 116. The stick 116 may further be coupled to the work tool 118.

The work tool 118 is moved with respect to the stick 116 by extending or retracting a work tool hydraulic cylinder 134. The work tool hydraulic cylinder 134 moves the work tool 118 via a bucket linkage assembly 136. A first end 138 of the work tool hydraulic cylinder 134 may be coupled to the stick 116. A second end 140 of the work tool hydraulic cylinder 134 is coupled to the bucket linkage assembly 136. In an embodiment, the bucket linkage assembly 136 may be referred as a work tool linkage assembly and may be used to couple any type of work tool.

Numerous different work tools 118 may be attached to the work machine 100 and may be controlled by the machine operator. Work tool 118 may include any device used to perform a particular task, such as a blade, a fork arrangement, a bucket, a shovel, a cutting device, a grasping device, and/or any other task-performing device known in the art.

A controller 150 can be provided for electrically controlling various aspects of the work machine 100 including prevention of overcurrent conditions. For example, the controller 150 can send and receive signals from various components of the work machine 100 during the operation of the work machine 100. The controller 150 can include onboard memory or memory in a remote location can be accessed. For example, the work machine 100 and controller 150 thereof can be wirelessly communicatively connected using connection 152 to remote apparatus 154, which can include memory 156.

INDUSTRIAL APPLICABILITY

In general, an apparatus 14 can be configured and equipped to detect levels of current being provided to an external component 12. When the current crosses a threshold, gates of the apparatus can be controlled to reduce the magnitude of the current being output to the external component 12, using a protection signal. This protection signal can be maintained for some time period before disabling the protection signal and allowing current to again be provided to the external component.

Figure 6:
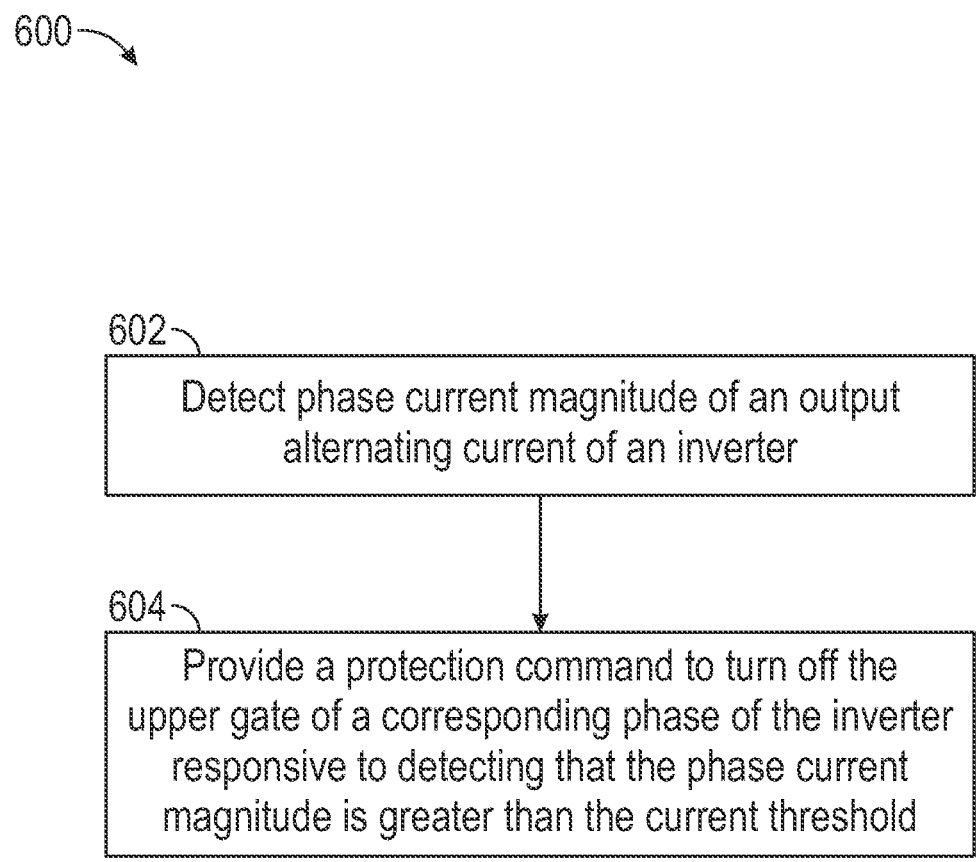
FIG. 6 shows a flow chart of a process for preventing overcurrent conditions in accordance with this disclosure.

FIG. 6 shows a flow chart of a process 600 for overcurrent protection in accordance with this disclosure. The process 600 can be performed by components of the apparatus 14 (FIG. 1), although embodiments are not limited thereto.

The process 600 begins with operation 602 with detecting a phase current magnitude of an output alternating current of an inverter. The process 600 continues with operation 604 with providing a protection command to turn off the upper gate of a corresponding phase of the inverter responsive to detecting that the phase current magnitude is greater than the current threshold.

By performing protection as described herein, overcurrent conditions can be adjusted before system shutdowns are necessary to prevent components. Electrical grid operators can thereby avoid costly shutdowns and time wasted in recovery from shutdowns.

The above detailed description is intended to be illustrative, and not restrictive. The scope of the disclosure should, therefore, be determined with references to the appended claims, along with the full scope of equivalents to which such claims are entitled.

What is claimed is:

1. An apparatus comprising:
    an inverter configured to provide an output N-phase alternating current to an external component, a phase of the N phases including an upper gate and a lower gate;
    a current detector configured to detect a magnitude of a phase current of the output N-phase alternating current for each phase; and
    a controller coupled to the current detector and to the inverter and configured to generate a gate command for controlling a gate of the inverter, the controller further configured to:
        determine a value for a current threshold less than a shutoff current threshold for the external component; and
        provide a protection command to turn off the upper gate of a corresponding phase of the inverter responsive to detecting that the magnitude of the phase current is greater than the current threshold.

2. The apparatus of claim 1, wherein the controller further comprises an analog-to-digital converter (ADC) and wherein the phase current is measured by the ADC and filtered by the controller.

3. The apparatus of claim 1, wherein the controller further comprises an analog-to-digital converter (ADC) and wherein the phase current is measured by the ADC and not filtered by the controller.

4. The apparatus of claim 1, wherein the controller is further configured to maintain the upper gate in an off state until the phase current magnitude is below the current threshold.

5. The apparatus of claim 4, wherein the controller is further configured to maintain the upper gate in an off state until the protection command and the gate command are in a same state.

6. The apparatus of claim 1, wherein the controller is configured to provide a command to turn off the lower gate of the corresponding phase responsive to detecting that the phase current is negative with a value of the phase current less than the current threshold.

7. The apparatus of claim 1, wherein the controller is configured to provide a command to turn off the upper gate of the corresponding phase responsive to detecting that the phase current is positive with a value of the phase current greater than the current threshold.

8. The apparatus of claim 1, wherein the controller is configured to provide a command to turn off the output alternating current responsive to detecting that the phase current magnitude is greater than the shutoff threshold.

9. The apparatus of claim 1, wherein the output N-phase alternating-current comprises a three-phase alternating current.

10. The apparatus of claim 1, wherein the external component comprises an electrical grid.

11. The apparatus of claim 1, wherein the external component comprises one of a motor or a generator.

12. A system for power delivery, the system comprising:
    a power device including at least one of an electrical grid, a microgrid, or a motor; and
    an apparatus coupled to the power device and configured to control current provided to the power device, the apparatus comprising:
        an inverter configured to provide an output N-phase alternating current to the power device, wherein when N equals two a phase of the N phases includes an upper gate and a lower gate;
        a current detector configured to detect a magnitude of a phase current of the output alternating current; and
        a controller coupled to the current detector and to the inverter and configured to generate a gate command for controlling a gate of the inverter, the controller further configured to:
            determine a value for a current threshold less than a shutoff current threshold for the power device; and
            provide a protection command to turn off the upper gate of a corresponding phase of the inverter responsive to detecting that the magnitude phase current magnitude is greater than the current threshold.

13. The system of claim 12, wherein the controller coupled to the power device further comprises an analog-to-digital converter (ADC) and wherein the phase current is measured by the ADC and filtered by the controller.

14. The system of claim 12, wherein the controller coupled to the power device further comprises an analog-to-digital converter (ADC) and wherein the phase current is measured by the ADC and not filtered by the controller.

15. The system of claim 12, wherein the controller is further configured to maintain the upper gate in an off state until the phase current magnitude is below the current threshold.

16. The system of claim 15, wherein the controller is further configured to maintain the upper gate in an off state until the protection command and the gate command are in a same state.

17. The system of claim 12, wherein the output N-phase alternating-current comprises a three-phase alternating current.

18. A method for controlling current in a power delivery system, the method comprising:
    detecting a phase current magnitude of an output alternating current of an inverter; and
    providing a protection command to turn off an upper gate of a corresponding phase of the inverter responsive to detecting that the phase current magnitude is greater than a threshold.

19. The method of claim 18, further comprising maintaining the upper gate in an off state until the phase current magnitude is below the current threshold.

20. The method of claim 19, further comprising detecting a state of a raw gate command to the upper gate; and maintaining the upper gate in an off state until the protection command and the gate command are in a same state.

21. The method of claim 18, further comprising providing a command to turn off a lower gate of the corresponding phase responsive to detecting that the phase current is negative with an absolute value of the phase current greater than the current threshold.

* * * * *